United States Patent
Kim et al.

(10) Patent No.: US 10,302,852 B2
(45) Date of Patent: May 28, 2019

(54) BACK LIGHT UNIT AND DISPLAY DEVICE INCLUDING THE SAME

(71) Applicant: LG ELECTRONICS INC., Seoul (KR)

(72) Inventors: Kyoungtae Kim, Seoul (KR); Sanghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/682,411

(22) Filed: Aug. 21, 2017

(65) Prior Publication Data

US 2018/0059317 A1    Mar. 1, 2018

(30) Foreign Application Priority Data

Aug. 26, 2016  (KR) ................ 10-2016-0109103

(51) Int. Cl.
*G02F 1/1333*  (2006.01)
*F21V 8/00*  (2006.01)

(52) U.S. Cl.
CPC ......... *G02B 6/0088* (2013.01); *G02B 6/0055* (2013.01); *G02B 6/0081* (2013.01);
(Continued)

(58) Field of Classification Search
CPC .. G02B 6/0088; G02B 6/0055; G02B 6/0081; G02B 6/0085; G02F 2001/133314;
(Continued)

(56) References Cited

U.S. PATENT DOCUMENTS 9,158,152 B2 * 10/2015 Noh ................. G02F 1/133608
2006/0028836 A1 * 2/2006 Shin ..................... G02B 6/0088
362/600
(Continued)

FOREIGN PATENT DOCUMENTS

JP    2008060077    3/2008
JP    5750140       7/2015
(Continued)

OTHER PUBLICATIONS

PCT International Application No. PCT/KR2017/008775, International Search Report dated Nov. 24, 2017, 3 pages.
(Continued)

*Primary Examiner* — Y M. Lee
(74) *Attorney, Agent, or Firm* — Lee, Hong, Degerman, Kang & Waimey PC

(57) ABSTRACT

A backlight unit and a display device including the same are provided. The backlight unit includes: a frame; a reflection sheet located on the frame; a housing coupled to at least one side of the frame; a substrate located on the housing; a light assembly mounted on the substrate; and a light guide plate located opposite to the light assembly on the reflection sheet, wherein the housing is exposed to the outside of the frame. Therefore, as the housing is exposed to the outside of the frame, even if a problem occurs in a light assembly, by separating only the housing, the problem can be solved, and the housing is exposed to the outside of the frame to enhance a heat releasing effect.

12 Claims, 16 Drawing Sheets

(52) U.S. Cl.
CPC ...... *G02B 6/0085* (2013.01); *G02F 1/133308* (2013.01); *G02F 2001/133317* (2013.01); *G02F 2001/133328* (2013.01)

(58) Field of Classification Search
CPC .......... G02F 2001/133317; G02F 2001/13332; G02F 2001/133322; G02F 2001/133325; G02F 2001/133328; G02F 1/133308
See application file for complete search history.

(56) References Cited

U.S. PATENT DOCUMENTS

| | | | | |
|---|---|---|---|---|
| 2008/0232134 | A1* | 9/2008 | Weng | G02B 6/009 |
| | | | | 362/612 |
| 2013/0208210 | A1* | 8/2013 | Yu | G02F 1/133308 |
| | | | | 362/611 |
| 2014/0184929 | A1* | 7/2014 | Nakamura | G02F 1/133308 |
| | | | | 362/633 |
| 2015/0009714 | A1* | 1/2015 | Okano | G02B 6/0073 |
| | | | | 362/631 |
| 2015/0212261 | A1 | 7/2015 | Masuda | |
| 2015/0277028 | A1* | 10/2015 | Nishii | G02F 1/133615 |
| | | | | 362/612 |
| 2017/0168226 | A1* | 6/2017 | Jo | G02F 1/133385 |

FOREIGN PATENT DOCUMENTS

| | | |
|---|---|---|
| KR | 1020110132801 | 12/2011 |
| KR | 1020120070871 | 7/2012 |
| KR | 1020150025404 | 3/2015 |
| KR | 1020150079231 | 7/2015 |
| WO | 2014208733 | 12/2014 |

OTHER PUBLICATIONS

European Patent Office Application Serial No. 17186555.3, Search Report dated Dec. 14, 2017, 8 pages.

* cited by examiner (a)

(b)

(a)

(b)

BACK LIGHT UNIT AND DISPLAY DEVICE INCLUDING THE SAME

Pursuant to 35 U.S.C. § 119(a), this application claims the benefit of earlier filing date and right of priority to Korean Patent Application No. 10-2016-0109103 filed on Aug. 26, 2016, the contents of which are hereby incorporated by reference herein in its entirety.

BACKGROUND OF THE INVENTION

Field of the Invention

The present invention relates to a backlight unit and a display device including the same.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

In accordance with an aspect of the present invention, a backlight unit includes: a frame; a reflection sheet located on the frame; a housing coupled to at least one side of the frame; a substrate located on the housing; a light assembly mounted on the substrate; and a light guide plate located opposite to the light assembly on the reflection sheet, wherein the housing is exposed to the outside of the frame.

The housing may include: a first surface that contacts the substrate; and a second surface bent from the first surface to be extended, wherein the second surface may be attached to an external side surface of the frame.

The second surface and the frame may be coupled through at least one screw.

The second surface and the frame may be coupled through a latch.

The housing may include a plurality of heat radiation fins protruded in a bottom surface direction of the housing on the second surface.

The housing may include an oxide layer located on the second surface.

The frame may include a side portion protruded in a front surface direction and constituting a side surface, and the side portion may be located at both ends of an area at which the housing is located.

In the light guide plate, a portion that does not contact the side portion may be protruded by a predetermined gap toward the light assembly.

In accordance with another aspect of the present invention, a display device includes: a frame; a reflection sheet located on the frame; a housing coupled to at least one side of the frame; a substrate located on the housing; a light assembly mounted on the substrate; a light guide plate located opposite to the light assembly on the reflection sheet; and a display panel located on the light guide plate, wherein the housing is exposed to the outside of the frame.

In accordance with another aspect of the present invention, a display device comprising: a display panel; a frame positioned behind the display panel; a light guide plate positioned between the display panel and the frame; a housing including a first part in contact with a rear surface of the frame and a second part bent from the first part, the second part facing a side of the light guide plate; a substrate disposed on the second part; and a light assembly mounted on the substrate.

The frame may comprise: a side portion facing the side of the light guide plate; and
an opening formed in the side portion, and wherein the second part covers the opening.

The light guide plate may include a front surface, a rear surface and a peripheral surface connecting the front surface and the rear surface, and wherein the frame may comprises: a side portion extending along the peripheral surface of the light guide plate; and an opening formed in the side portion, the opening positioned between the light guide plate and the second part.

The display device may further comprise a dam pad disposed on the second part, the dam pad extending along the side of the light guide plate.

The dam pad may be contact with the light guide plate.
The dam pad may be disposed on the substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
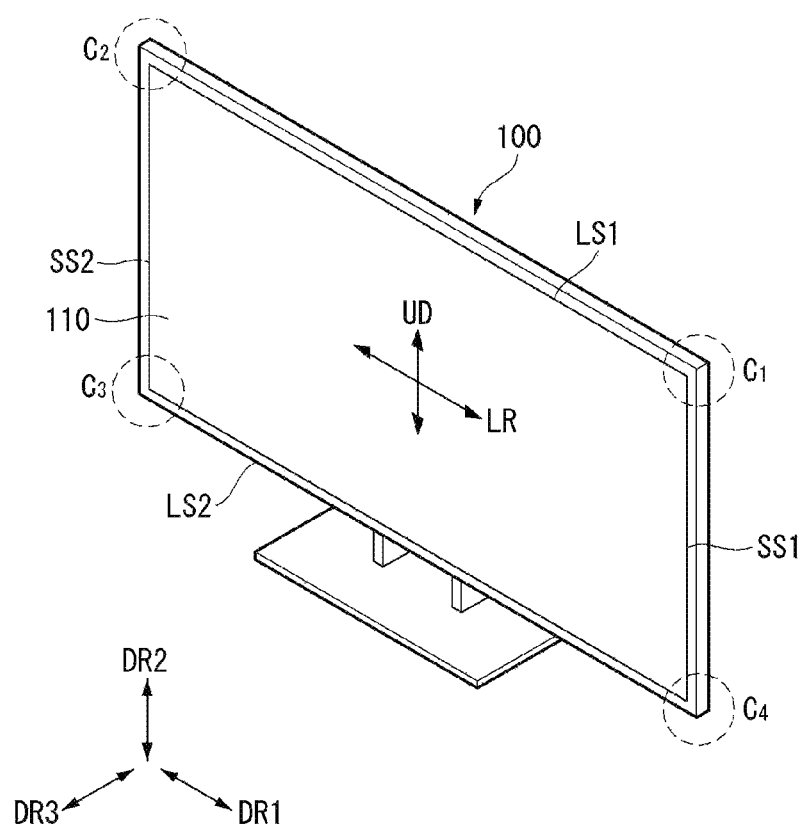
FIGS. 1 to 11 are views illustrating a configuration of a display device according to an exemplary embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

FIGS. 1 to 11 are views illustrating a configuration of a display device according to an exemplary embodiment of the present invention.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short side s SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction D R2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction. Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
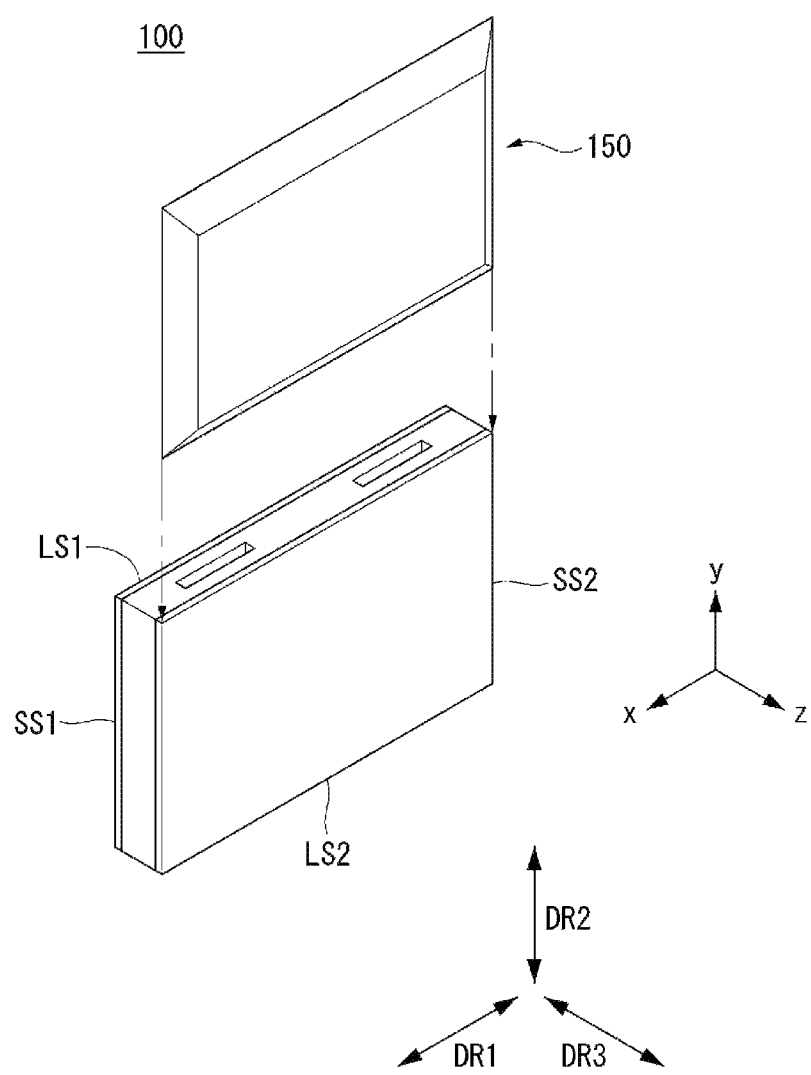

As shown in FIG. 2, a display device 100 according to an exemplary embodiment of the present invention may include a display panel 110 and a back cover 150 of the rear side of the display panel 110.

The back cover 150 may be connected to the display panel 110 with a sliding method in a direction toward the second long side LS2 from the first long side LS1, i.e., in the second direction DR2. In other words, the back cover 150 may be inserted with a sliding method into the first short side SS1 of the display panel 110, the second short side SS2 corresponding to the first short side SS1, and the first long side LS1 adjacent to the first short side SS1 and the second short side SS2 and located between the first short side SS1 and the second short side SS2.

In order to connect the back cover 150 to the display panel 110 with a sliding method, in the back cover 150 and/or other structures adjacent thereto, a protruding portion, a sliding portion, and a coupler may be included.

Figure 3:
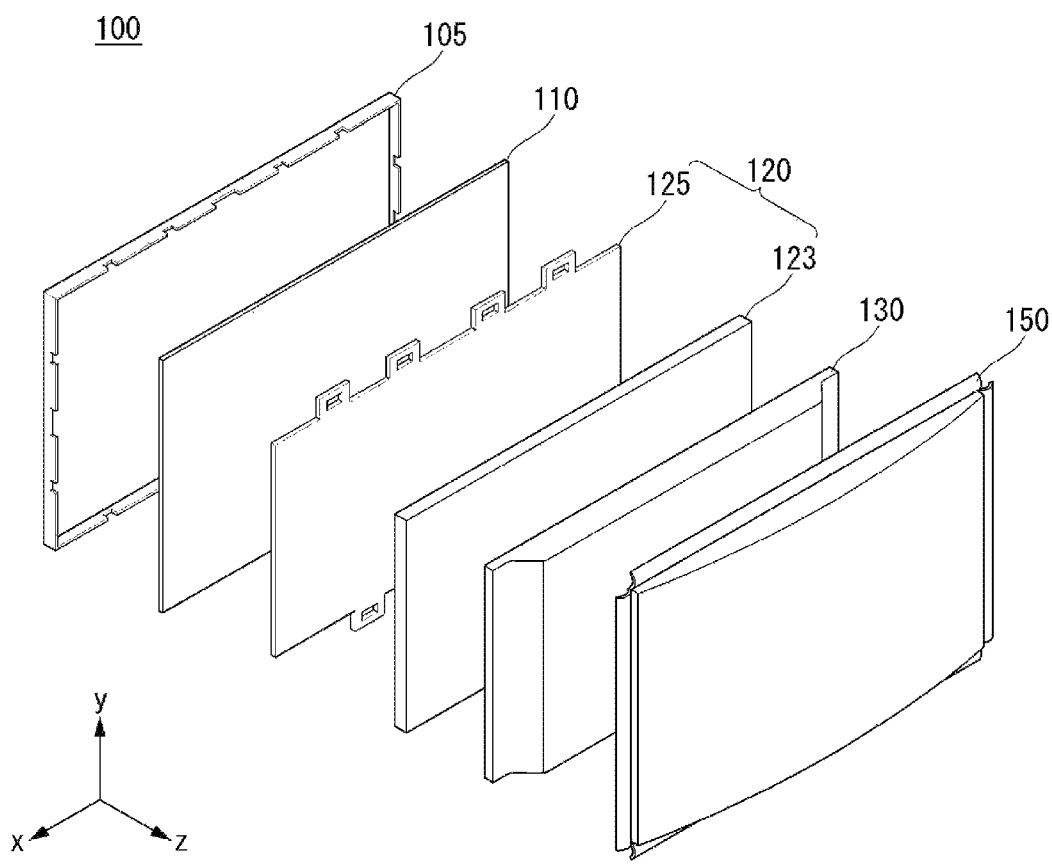

As shown in FIG. 3, the display device 100 according to an exemplary embodiment of the present invention may include a front cover 105, a display panel 110, a backlight unit 120, a frame 130, and a back cover 150.

The front cover 105 may cover at least a partial area of a front surface and a side surface of the display panel 110. The front cover 105 may have a quadrangular frame shape whose center is hollow. Because the center of the front cover 105 is hollow, an image of the display panel 110 may be displayed to the outside.

The front cover 105 may be divided into a front surface cover and a side surface cover. That is, the front cover 105 may be divided into a front surface cover located at the front surface side of the display panel 110 and a side surface cover located at the side surface side of the display panel 110. The front surface cover and the side surface cover may be separately formed. Any one of the front surface cover and the side surface cover may be omitted. For example, for an enhanced design, only the side surface cover may exist without the front surface cover.

The display panel 110 may be provided at a front surface of the display device 100 to display an image. The display panel 110 may divide an image into a plurality of pixels to output the image to correspond to a color, brightness, and chroma per each pixel. The display panel 110 may be divided into an active area that displays an image and an inactive area that does not display an image. The display panel 110 may include a front substrate and rear substrate opposite to each other with a liquid crystal layer interposed therebetween.

The front substrate may include a plurality of pixels formed with red R, green G, and blue B sub pixels. The front substrate may generate an image corresponding to a red color, a green color, or a blue color according to a control signal.

The rear substrate may include switching elements. The rear substrate may switch a pixel electrode. For example, the pixel electrode may change molecule arrangement of the liquid crystal layer according to a control signal applied from the outside. The liquid crystal layer may include a plurality of liquid crystal molecules. The liquid crystal molecules may change arrangement to correspond to a voltage difference that has occurred between a pixel electrode and a common electrode. The liquid crystal layer may transfer light provided from the backlight unit 120 to the front substrate.

The backlight unit 120 may be located at the rear surface side of the display panel 110. The backlight unit 120 may include a plurality of light sources. A light source of the backlight unit 120 may be disposed in a direct type or an edge type. When the backlight unit 120 is the direct type backlight unit 120, a diffusion plate may be further included.

The backlight unit 120 may be coupled to a front surface and a side surface of the frame 130. For example, a plurality of light sources may be disposed at the inside of one side of the frame 130, and in this case, the backlight unit may be referred to as an edge type backlight unit.

The backlight unit 120 may be driven with an entire driving method or a partial driving method such as local dimming and impulsive. The backlight unit 120 may include an optical sheet 125 and an optical layer 123.

The optical sheet 125 may enable light of a light source to be uniformly transferred to the display panel 110. The optical sheet 125 may be formed with a plurality of layers. For example, the optical sheet 125 may include at least one prism sheet and/or at least one diffusion sheet.

In the optical sheet 125, at least one coupler 125d may exist. The coupler 125d may be coupled to the front cover 105 and/or the back cover 150. That is, the coupler 125d may be directly coupled to the front cover 105 and/or the back cover 150. Alternatively, the coupler 125d may be coupled to a structure coupled on the front cover 105 and/or the back cover 150. That is, the coupler 125d may be indirectly coupled to the front cover 105 and/or the back cover 150.

The optical layer 123 may include a light source. A detailed configuration of the optical layer 123 will be described in a corresponding portion.

The frame 130 may perform a function of supporting constituent elements of the display device 100. For example, constituent elements of the backlight unit 120 may be coupled to the frame 130. The frame 130 may be made of a metal material such as an aluminum alloy.

The back cover 150 may be located at a rear surface of the display device 100. The back cover 150 may protect internal constituent elements from an external impact. At least a portion of the back cover 150 may be coupled to the frame 130 and/or the front cover 105. The back cover 150 may be an injection material made of a resin material.

Figure 4:
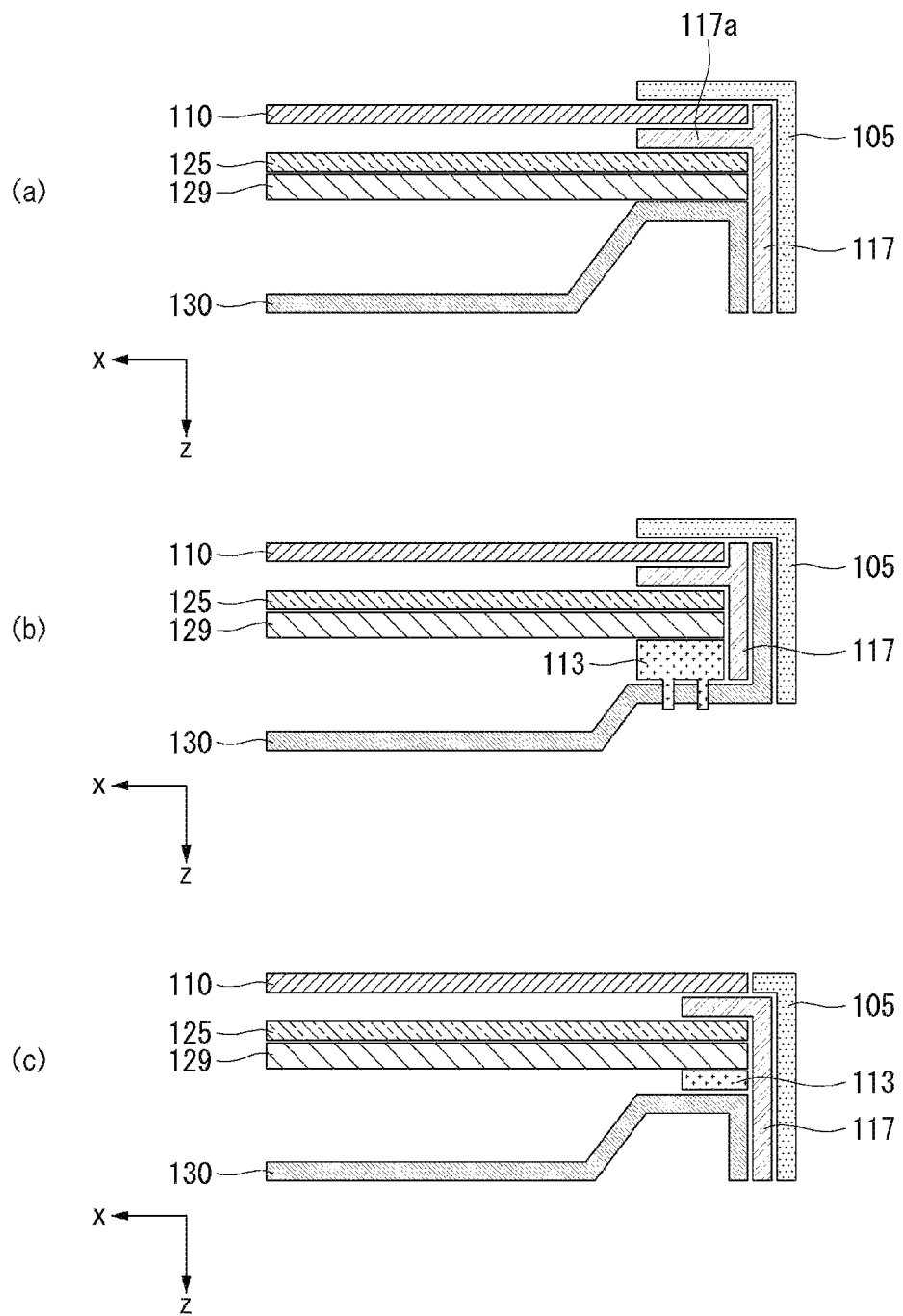
Figure 5:
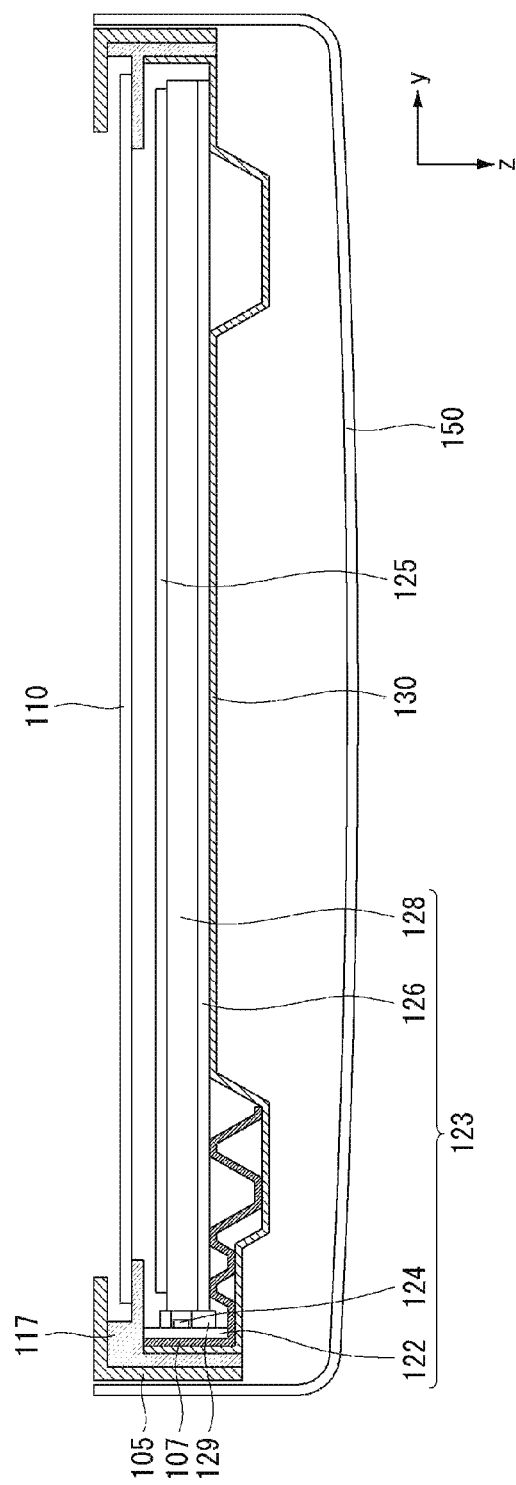
Figure 6:
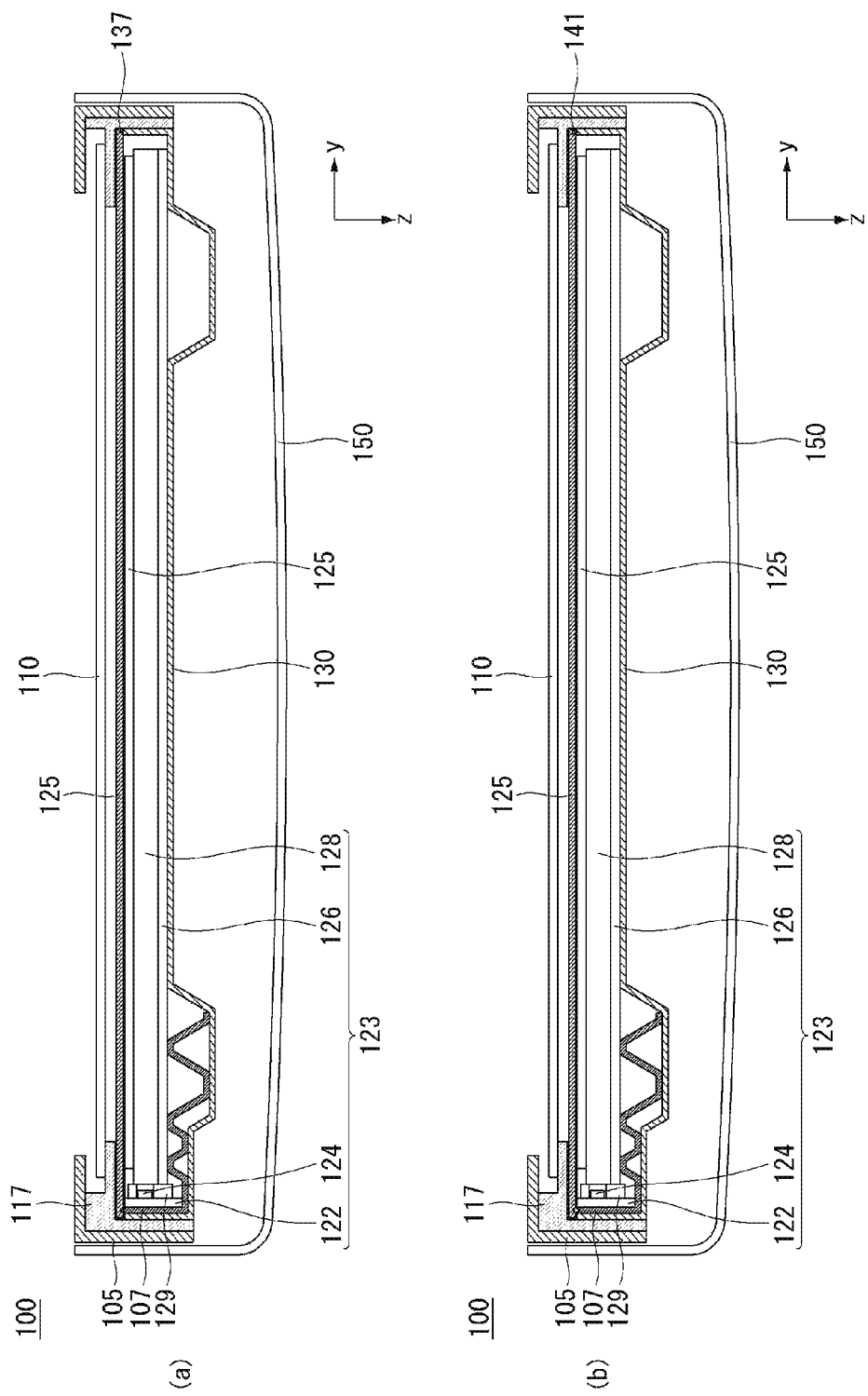

FIGS. 4 and 5 are views illustrating a configuration of the optical sheet 125.

As shown in FIG. 4A, at an upper portion of the frame 130, the optical sheet 125 may be located. The optical sheet 125 may be coupled to the frame 130 at an edge of the frame 130. The optical sheet 125 may be directly received at an edge of the frame 130. That is, the optical sheet 125 may be supported by the frame 130. An upper surface of an edge of the optical sheet 125 may be enclosed by a first guide panel 117. For example, the optical sheet 125 may be located between an edge of the frame 130 and a flange 117a of the first guide panel 117.

At the front surface side of the optical sheet 125, the display panel 110 may be located. An edge of the display panel 110 may be coupled to the first guide panel 117. That is, the display panel 110 may be supported by the first guide panel 117.

An edge area of the front surface of the display panel 110 may be enclosed by the front cover 105. For example, the display panel 110 may be located between the first guide panel 117 and the front cover 105.

As shown in FIG. 4B, the display device 100 according to an exemplary embodiment of the present invention may further include a second guide panel 113. The optical sheet 125 may be coupled to the second guide panel 113. That is, the second guide panel 113 may be coupled to the frame 130, and the optical sheet 125 may be coupled to the second guide panel 113. The second guide panel 113 may be made of a material different from that of the frame 130. The frame 130 may have a form that encloses the first and second guide panels 117 and 113.

As shown in FIG. 4C, in the display device 100 according to an exemplary embodiment of the present invention, the front cover 105 may not cover a front surface of the display panel 110. That is, one end portion of the front cover 105 may be located at a side surface of the display panel 110.

As shown in FIG. 5, the optical layer 123 may include a substrate 122, a reflection sheet 126, a light assembly 124, and a light guide plate 128.

The optical layer 123 may be located on the frame 130. For example, the optical layer 123 may be located between the frame 130 and the optical sheet 125. The optical layer 123 may be supported by the frame 130. In order to support the optical layer 123, at least one portion of the frame 130 may contact the optical layer 123.

At least another portion of the frame 130 may be bent to protrude in an opposite direction of the optical layer 123. For example, both sides of the frame 130 may be protruded in an opposite direction of the optical layer 123. That is, the frame 130 may be formed. Accordingly, rigidity of the frame 130 may be enhanced.

The substrate 122 may be located in at least one side of the inside of the frame 130. The substrate 122 may be coupled to a housing 107 located between the substrate 122 and the frame 130. The substrate 122 may be directly coupled to the housing 107. For example, the substrate 122 may have a form coupled to at least one of the first guide panel 117, the frame 130, the front cover 105, and the housing 107.

The housing 107 may be located at one side to which the substrate 122 is coupled within the frame 130. The housing 107 may be bent at least one time from one side of the frame 130 to be extended to a lower surface within the frame 130. A portion extended to a lower surface of the housing 107 may support the reflection sheet 126. For example, a portion extended to a lower surface of the housing 107 may support one side of the reflection sheet 126, and the frame 130 may support a central portion of the reflection sheet 126. A portion extended to a lower surface of the housing 107 may be bent to protrude in a direction of the reflection sheet 126 in order to support the reflection sheet 126.

The substrate 122 may be located in a side surface direction of the reflection sheet 126 and/or the light guide plate 128. That is, a front surface of the substrate 122 may face toward the optical layer 123.

On the substrate 122, the light assembly 124 may be mounted. The light assembly 124 may be located in a side surface direction of the light guide plate 128. That is, light emitted from the light assembly 124 may advance toward the light guide plate 128.

The substrate 122 and the reflection sheet 126 and/or the light guide plate 128 may be separated by a predetermined gap. The light assembly 124 and the reflection sheet 126 and/or the light guide plate 128 may be separated by a predetermined gap. The light assembly 124 may be separated from the reflection sheet 126 and/or the light guide plate 128 by a dam pad 129 located on the substrate 122. That is, a height of the light assembly 124 in a direction of the light guide plate 128 may be lower than that of the dam pad 129 in a direction of the light guide plate 128. Because the light assembly 124 is separated from the reflection sheet 126 and/or the light guide plate 128, the light assembly 124 may not erroneously operate or a function thereof may not be weakened. A detailed configuration of the substrate 122 and the optical layer 123 may be described in a corresponding portion.

The optical sheet 125 may be located between the optical layer 123 and the display panel 110. The optical sheet 125 may be guided on the optical layer 123 by the first guide panel 117. The optical sheet 125 may be coupled to a rear surface of the flange 117a of the first guide panel 117.

The display panel 110 may be located at a front surface of the optical sheet 125. A location of the display panel 110 may be guided by the first guide panel 117. The display panel 110 may be coupled to a front surface of the flange 117a of the first guide panel 117.

As shown in FIG. 6A, in the display device 100 according to an exemplary embodiment of the present invention, the optical sheet 125 may be coupled and fixed to the frame 130. Specifically, the optical sheet 125 may be coupled and fixed to a fixing portion 137 of the frame 130.

The fixing portion 137 may be provided at a side wall of the frame 130. The fixing portion 137 may be protruded from the side wall of the frame 130 in a direction toward an optical sheet. The fixing portion 137 located at both side walls of the frame 130 may fix both sides of the optical sheet 125.

As shown in FIG. 6B, in the display device 100 according to an exemplary embodiment of the present invention, the frame 130 and the optical sheet 125 may be coupled and fixed through a mold 141. That is, the mold 141 may be coupled to a side wall of the frame 130, and the optical sheet 125 may be coupled to the mold 141.

In the display device according to an exemplary embodiment of the present invention, as the optical sheet 125 is directly coupled to the frame 130 instead of the first guide panel 117, the optical sheet 125 may be more strongly fixed to a front surface of the optical layer 123.

Figure 7:
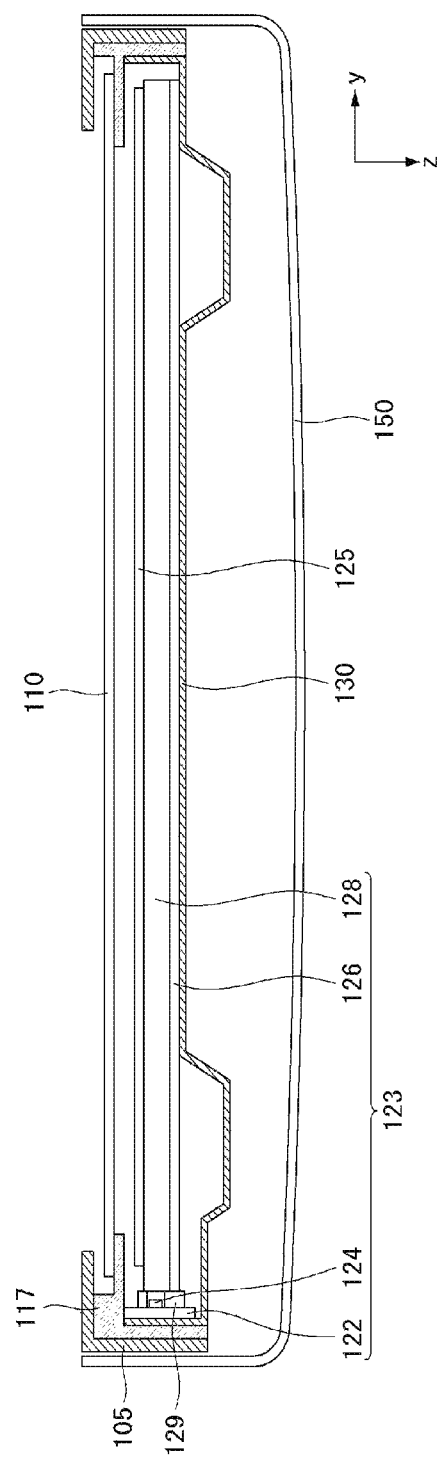

Referring to FIG. 7, in the display device 100 according to an exemplary embodiment of the present invention, the substrate 122 may be directly coupled on the frame 130.

Because the frame 130 is directly coupled to the substrate 122, the frame 130 may support both sides of the optical layer 123. In order to support the reflection sheet 126, a portion of the frame 130 corresponding to both ends of the reflection sheet 126 of a lower surface of the frame 130 may be protruded in a direction of the reflection sheet 126.

Because the frame 130 and the substrate 122 are directly coupled without an intermediate material therebetween, there is a merit that the frame 130 may more widely use an internal space.

Figure 8:
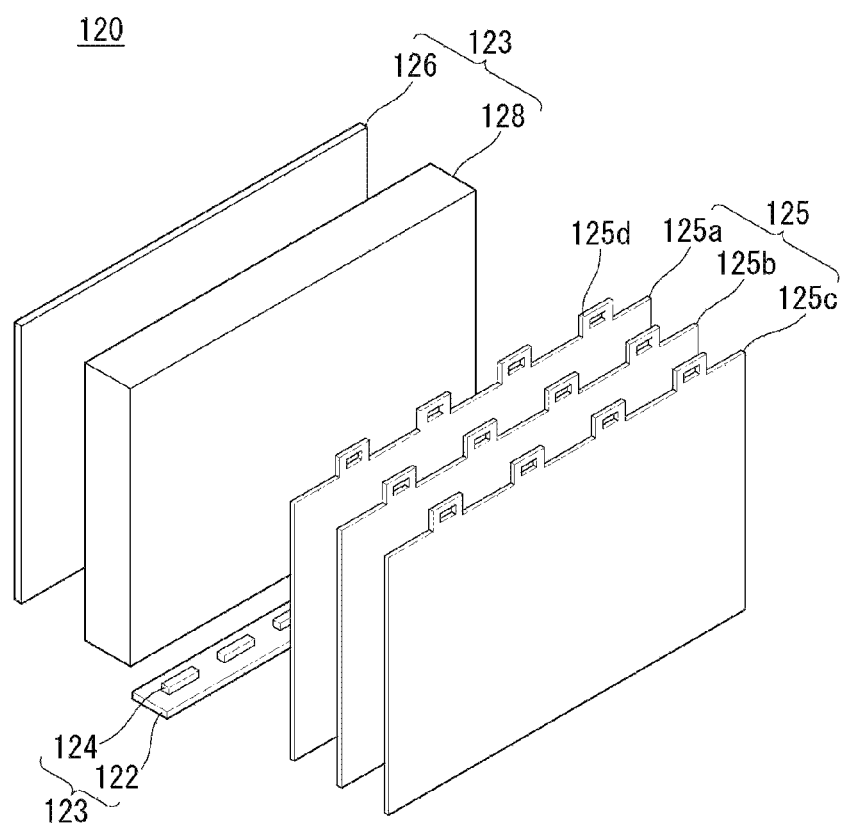
Figure 9:
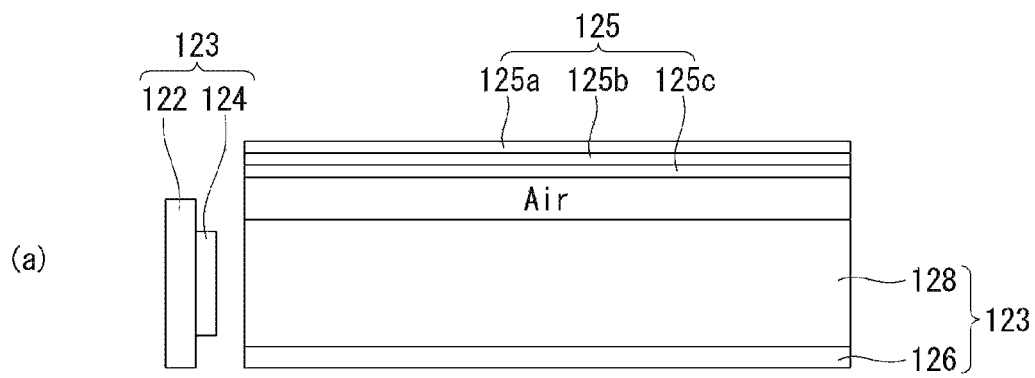
Figure 9:
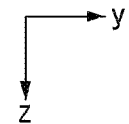
Figure 9:
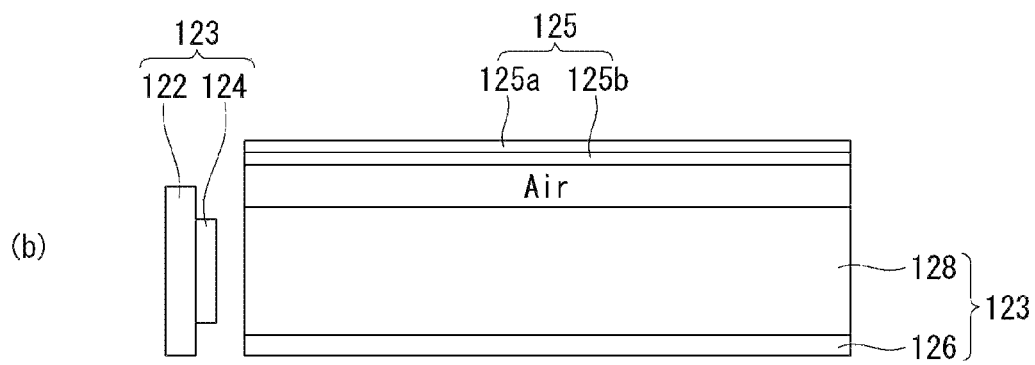
Figure 9:
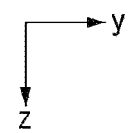

Referring to FIGS. 8 and 9, the backlight unit 120 may include a substrate 122, at least one light assembly 124, an optical layer 123 including a reflection sheet 126 and a light guide plate 128, and an optical sheet 125 located at the front surface side of the optical layer 123.

The substrate 122 may be located in at least one side of another configuration of the optical layer 123. The substrate 122 may be extended in a direction orthogonal to a lengthwise direction of another configuration of the optical layer 123.

In the substrate 122, at least one light assembly 124 may be mounted. In the substrate 122, an electrode pattern for connecting an adaptor and the light assembly 124 may be formed. For example, in the substrate 122, a carbon nanotube electrode pattern for connecting the light assembly 124 and the adaptor may be formed.

The substrate 122 may be made of at least one of polyethyleneterephthalate (PET), glass, polycarbonate (PC), and silicon. The substrate 122 may be a Printed Circuit Board (PCB) that mounts at least one light assembly 124.

In the substrate 122, the light assembly 124 may be disposed at a predetermined gap. A lengthwise direction width of the light assembly 124 may be smaller than a thickness direction width of the light guide plate 128. Therefore, most light emitted from the light assembly 124 may be transferred to the inside of the light guide plate 128.

The light assembly 124 may be a Light Emitting Diode (LED) chip or an LED package including at least one LED chip.

The light assembly 124 may be formed with a color LED that emits at least one of a red color, a blue color, and a green color or a white LED. The color LED may include at least one of a red LED, a blue LED, and a green LED.

A light source included in the light assembly 124 may be a Chip On Board (COB) type light source. The COB type light source may have a form that directly couples an LED chip, which is a light source to the substrate 122. Therefore, a process may be simplified. Further, resistance may be lowered and thus energy to be lost due to a heat may be reduced. That is, power efficiency of the light assembly 124 may be enhanced. The COB type light source may provide more bright lighting. The COB type light source may be implemented in a smaller thickness and a lighter weight than a conventional light source.

The light guide plate 128 may be located at an upper portion of the light assembly 124. The light guide plate 128 may perform a function of widely diffusing light applied from the light assembly 124. Although not shown, in the light guide plate 128, the light assembly 124 and an adjacent surface may be formed in a step shape. A lower surface of the light guide plate 128 is formed in a shape inclined upward to reflect light applied from the light assembly 124 upward.

The reflection sheet 126 may be located at the rear surface side of the light guide plate 128. The reflection sheet 126 may reflect light emitted from the light assembly 124 to the front surface side. The reflection sheet 126 may reflect again light reflected from the light guide plate 128 to the front surface side.

The reflection sheet 126 may include at least one of a metal and metal oxide, which are a reflection material. For example, the reflection sheet 126 may include a metal and/or metal oxide having high reflectivity, such as at least one of aluminum (Al), silver (Ag), gold (Au), and titanium dioxide (TiO2).

The reflection sheet 126 may be formed by depositing and/or coating a metal or metal oxide. On the reflection sheet 126, ink including a metal material may be printed. In the reflection sheet 126, a deposition layer may be formed using a vacuum deposition method such as a heat deposition method, an evaporation method, or a sputtering method. In the reflection sheet 126, a coating layer and/or a print layer may be formed using a printing method, a gravure coating method, or a silk screen method.

At the front surface side of the light guide plate 128, a diffusion plate (not shown) may be further included. The diffusion plate may diffuse light emitted from the light guide plate 128 upward.

An air gap may be formed between the light guide plate 128 and the optical sheet 125. The air gap may perform a buffer function of widely spreading light emitted from the light assembly 124. A resin may be deposited on the light assembly 124 and/or the reflection sheet 126. The resin may perform a function of diffusing light emitted from the light assembly 124.

The optical sheet 125 may be located at the front surface side of the light guide plate 128. A rear surface of the optical sheet 125 may come in close contact with the light guide plate 128, and a front surface of the optical sheet 125 may come in close contact with a rear surface of the display panel 110.

The optical sheet 125 may include at least one sheet. Specifically, the optical sheet 125 may include at least one prism sheet and/or at least one diffusion sheet. A plurality of sheets included in the optical sheet 125 may be in a bonding state and/or a close contact state.

The optical sheet 125 may be formed with a plurality of sheets having different functions. For example, the optical sheet 125 may include first to three optical sheets 125a to 125c. The first optical sheet 125a may have a function of a diffusion sheet, and the second and third optical sheets 125b and 125c may have a function of a prism sheet. The number and/or a location of diffusion sheets and prism sheets may be changed. For example, the optical sheet 125 may include the first optical sheet 125a, which is a diffusion sheet and the second optical sheet 125b, which is a prism sheet.

The diffusion sheet prevents light emitted from the light guide plate 128 from partially concentrating, thereby more uniformly making luminance of light. The prism sheet concentrates light emitted from the diffusion sheet to enable light to be vertically applied to the display panel 110.

The coupler 125d may be formed in at least one of corners of the optical sheet 125. The coupler 125d may be formed in at least one of the first to third optical sheets 125a to 125c.

The coupler 125d may be formed at a corner of the long side of the optical sheet 125. The coupler 125d formed at the first long side and the coupler 125d formed at the second long side may be asymmetric. For example, a location and/or the number of the coupler 125d formed at the first long side and the coupler 125d formed at the second long side may be different.

Figure 10:
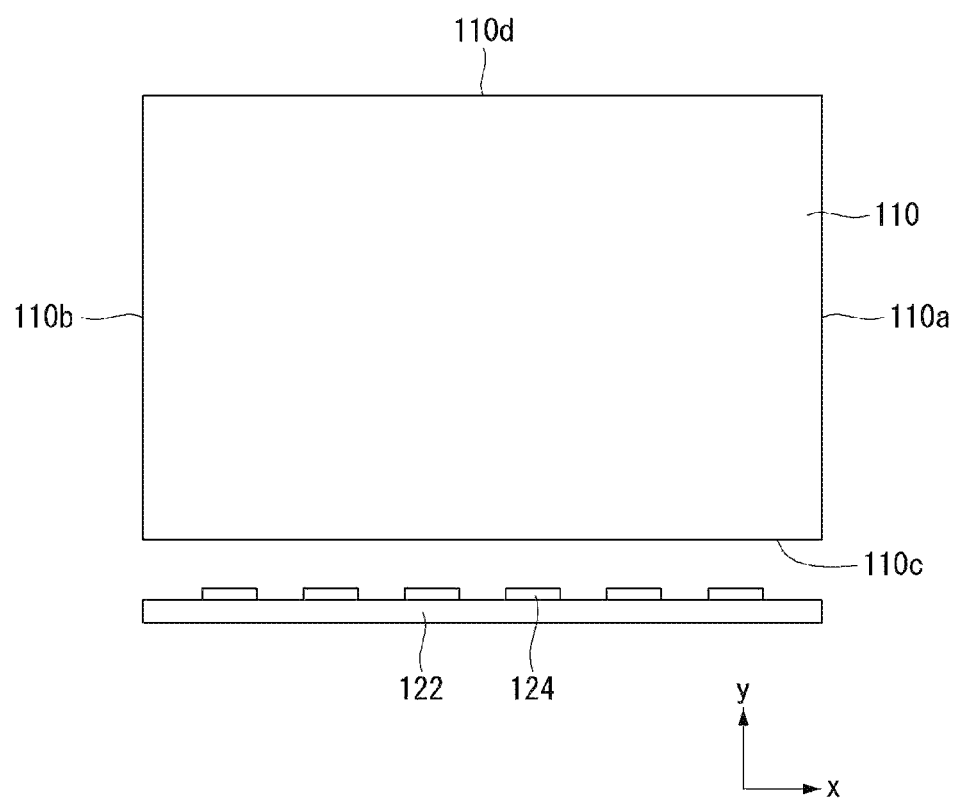
Figure 11:
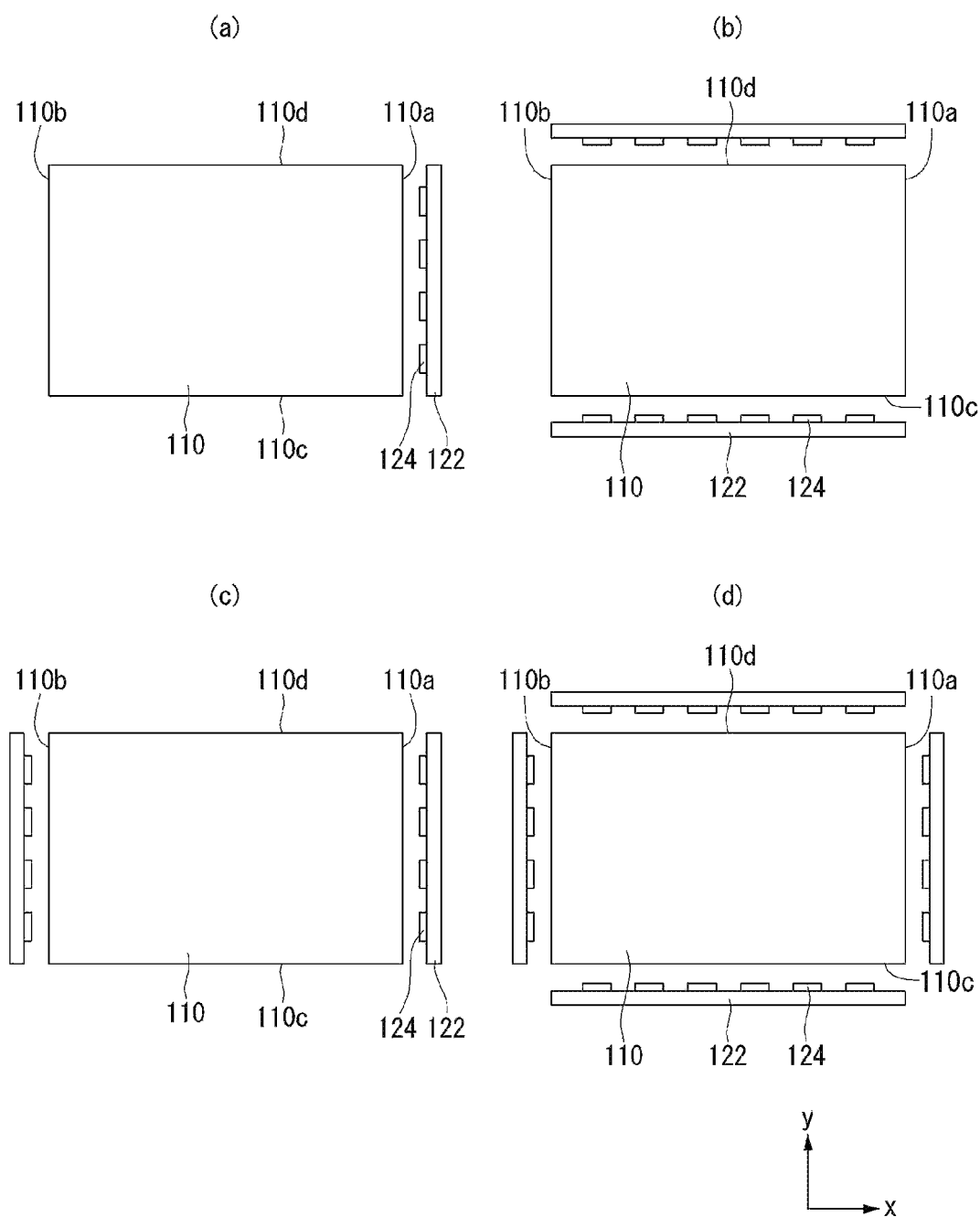

Referring to FIGS. 10 and 11, the substrate 122 and the light assembly 124 may be located in a direction of a lower side surface 110c of the display panel 110. A backlight unit in which the light assembly 124 is disposed at a side surface of the display panel 110 may be referred to as an edge type backlight unit.

As shown in FIG. 10, the light assembly 124 may emit light from the lower side surface 110c of the display panel 110 in a direction of an upper side surface 110d. That is, light emitted from the light assembly 124 is diffused from the lower side surface 110c to the upper side surface 110d of the display panel 110 to emit the entire display panel 110. However, the present invention is not limited thereto and the light assembly 124 may be located at the upper side surface 110d of the display panel 110.

As shown in FIG. 11A, the light assembly 124 may be located at a right side surface 110a of the display panel 110. However, the present invention is not limited thereto and the light assembly 124 may be located at a left side surface 110b of the display panel 110.

As shown in FIG. 11B, the light assembly 124 may be located at the lower side surface 110c and the upper side surface 110d of the display panel 110. As shown in FIG. 9C, the light assembly 124 may be located at the right side surface 110a and the left side surface 110b of the display panel 110.

As shown in FIGS. 11B and 11C, a backlight unit in which the light assemblies 124 are disposed at opposing both ends of the display panel 110 is referred to as a dual type backlight unit. The dual type backlight unit may easily diffuse light to a front surface of the display panel 110 in even weak light.

As shown in FIG. 11D, the light assembly 124 may be located at an entire surface of the display panel 110. When the light assembly 124 is located at an entire surface of the display panel 110, the dual type backlight unit may diffuse light more easily than other backlight units.

Figure 12:
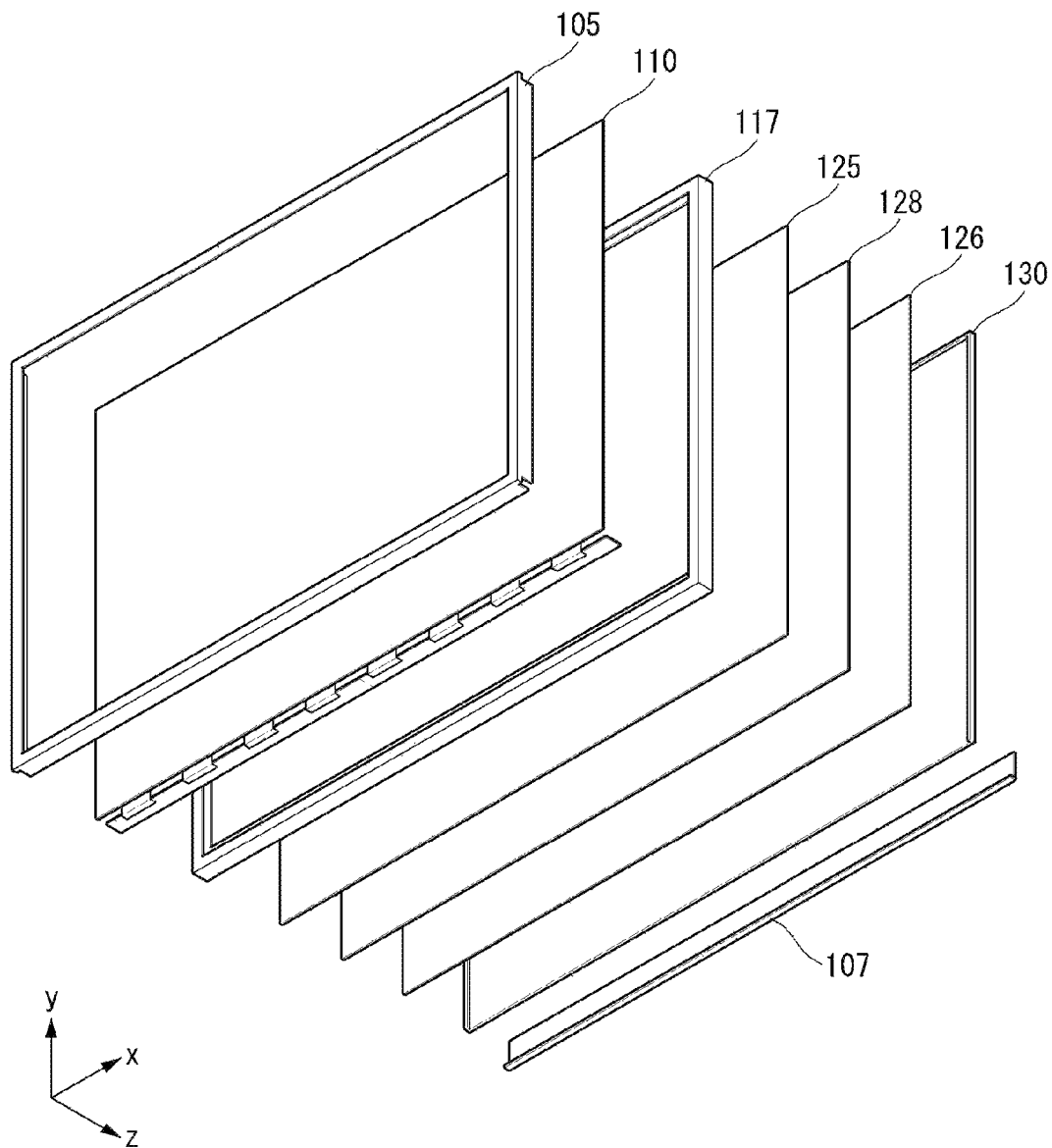
FIGS. 12 and 13 are views illustrating a configuration of a display device according to an exemplary embodiment of the present invention.
Figure 13:
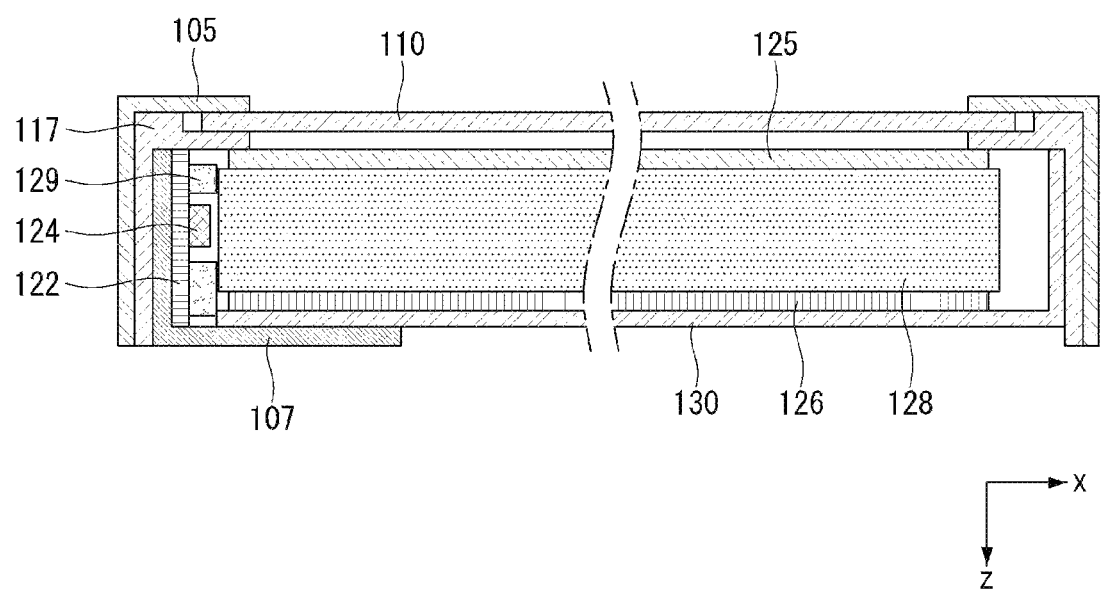

FIGS. 12 and 13 are views illustrating a configuration of a display device according to an exemplary embodiment of the present invention.

As shown in FIGS. 12 and 13, a display device according to an exemplary embodiment of the present invention may include a first surface in which the housing 107 contacts the substrate 122 and a second surface bent from the first surface to be extended. The second surface of the housing 107 may be extended to an outer side surface of the frame 130. That is, the second surface of the housing 107 may be coupled to an external side surface of the frame 130.

The housing 107 and the frame 130 may be coupled by at least one screw. However, the present invention is not limited thereto and the housing 107 and the frame 130 may be coupled by a latch.

Accordingly, the second surface of the housing 107 may be exposed to the outside of the frame 130. Because the housing 107 is exposed to the outside of the frame 130, even if a problem occurs in the light assembly 124, by separating only the housing 107, the problem can be solved. Accordingly, contamination of the optical sheet 125 and the light guide plate 128 that may occur when separating a structure can be prevented.

Further, because a portion of the housing 107 to which the light assembly 124 is coupled is exposed to the outside of the frame 130, a heat releasing effect can be enhanced.

Figure 14:
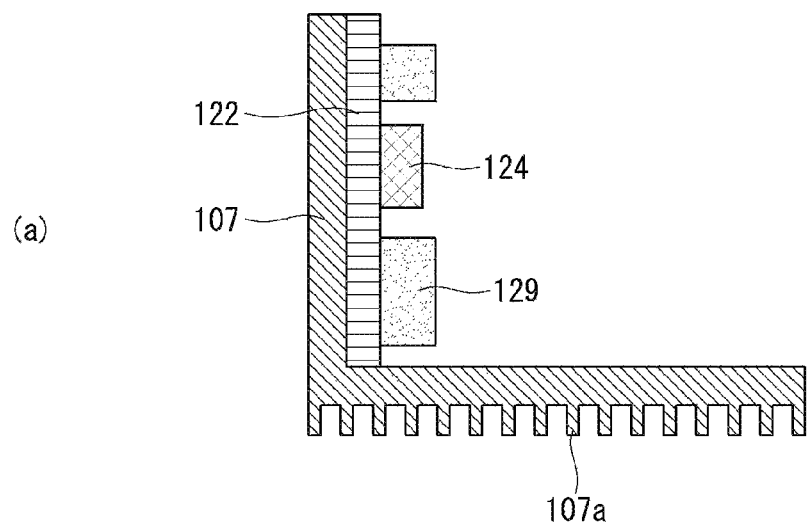
FIG. 14 is a view illustrating a configuration of a housing according to an exemplary embodiment of the present invention.
Figure 14:
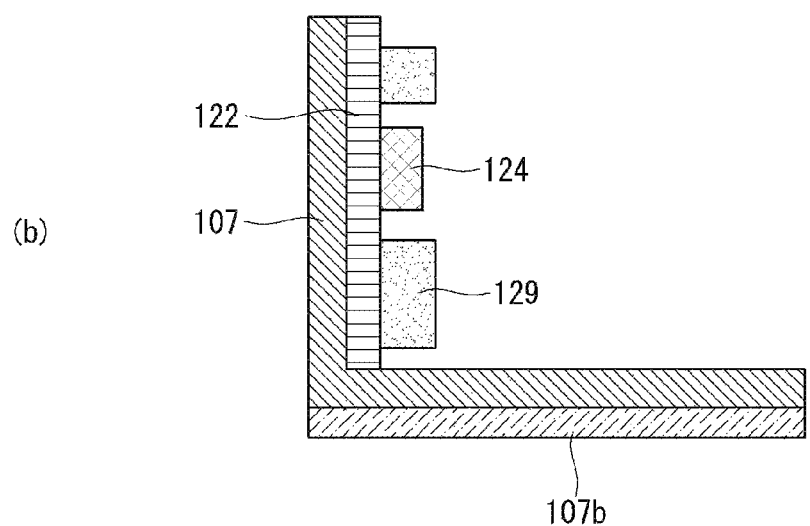

FIG. 14 is a view illustrating a configuration of a housing according to an exemplary embodiment of the present invention.

As shown in FIG. 14A, a plurality of heat radiation fins 107a may be formed on a second surface of the housing 107. The heat radiation fin 107a may have a shape protruded in a direction of a bottom surface of the housing 107.

When a plurality of heat radiation fins 107a are formed in the housing 107, a surface area of the housing 107 may be enlarged. Accordingly, a heat releasing ability of the housing 107 can be further enhanced.

As shown in FIG. 14B, on the second surface of the housing 107, an oxide layer 107b may be formed. The oxide layer 107b may be a material that oxidizes the housing 107. For example, the oxide layer 107b may be formed at the second surface of the housing 107 using an anodizing processing method. A characteristic of the oxide layer 107b may be adjusted by a temperature, a voltage, and a current of a processing liquid in the anodizing processing method.

The oxide layer 107b may compensate a low emission rate of the housing 107. Accordingly, a heat releasing ability of the housing 107 can be enhanced.

Figure 15:
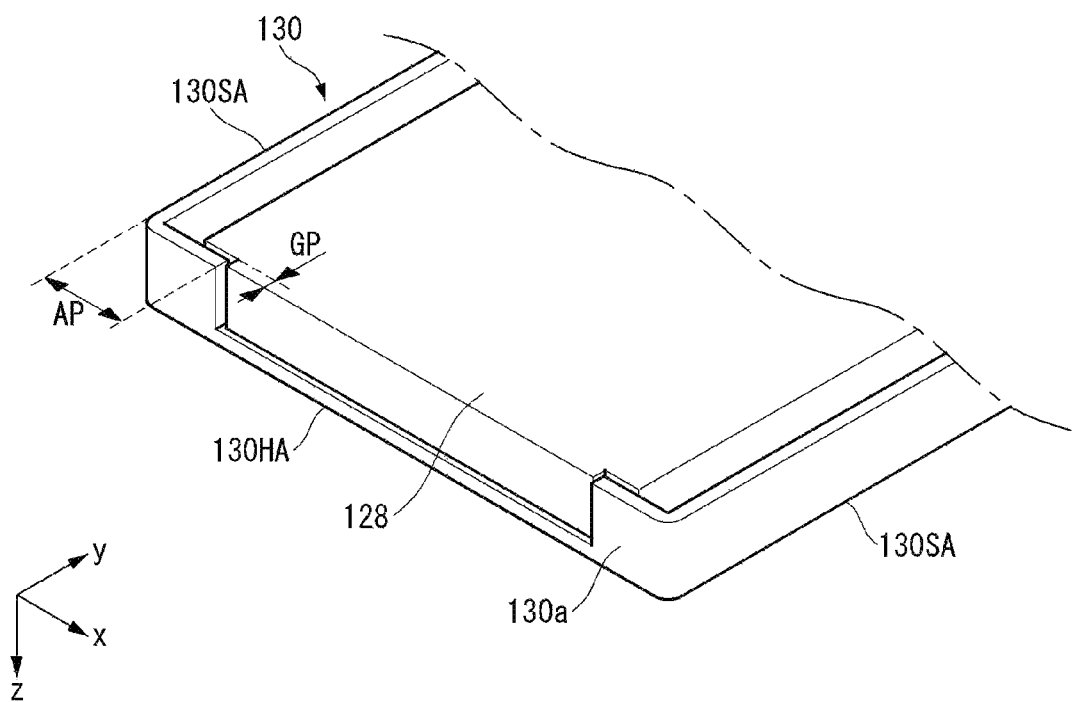
FIGS. 15 and 16 are views illustrating a configuration and a coupling relationship of a display device according to an exemplary embodiment of the present invention.
Figure 16:
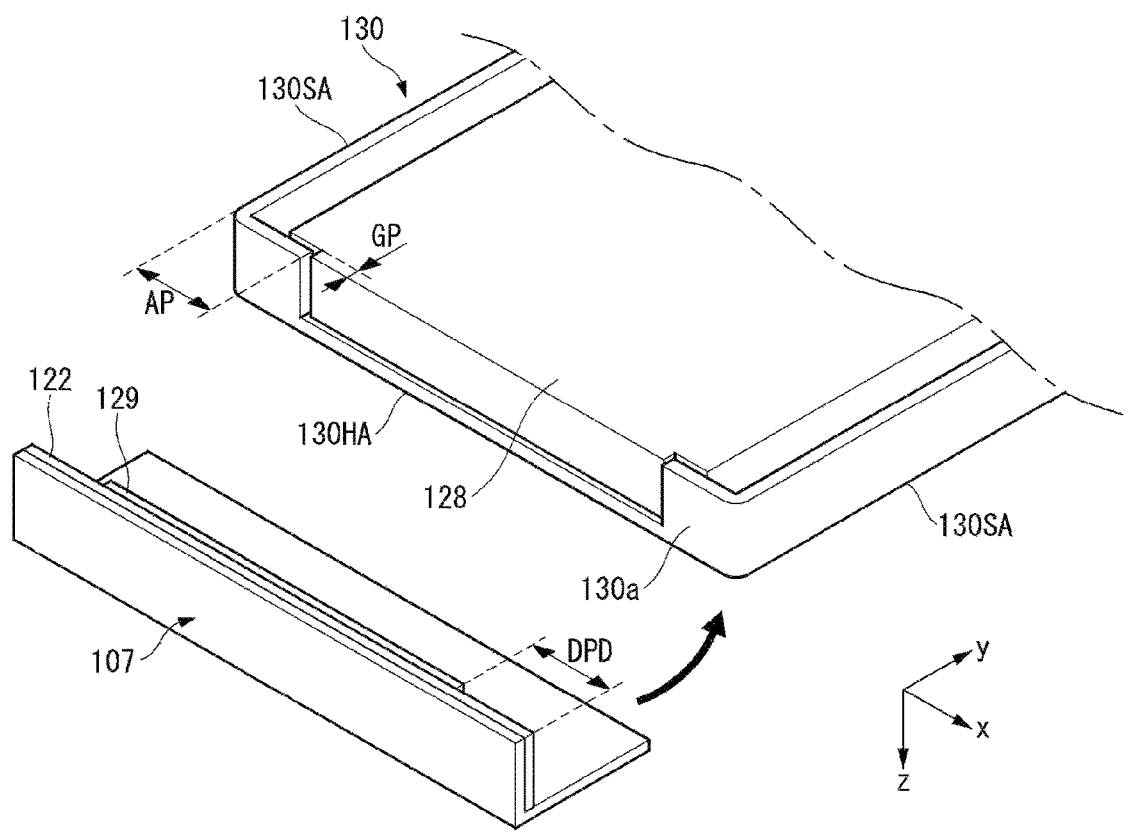

FIGS. 15 and 16 are views illustrating a configuration and a coupling relationship of a display device according to an exemplary embodiment of the present invention.

As shown in FIG. 15, in the frame 130, in only at least a portion of an area 130HA in which the housing is located, a side portion 130a may be located. The side portion 130a forms a side surface of the frame 130 and may be protruded in a front surface direction of the display device. In order to enable light of the light assembly to advance to the inside of the display device, at a portion of the area 130HA in which the housing of the frame 130 is located, the side portion 130a may not be located.

The side portion 130a may be extended by a predetermined length AP from a side area 130SA connected to the housing area 130HA of the frame 130 to the housing area 130HA. That is, at a predetermined length AP from both ends of the housing area 130HA of the frame 130, the side portion 130a may be located. Because the side portions 130a are located at both ends of the housing area 130HA of the frame 130, when removing a housing from the frame 130, the light guide plate 128 may not be separated to the outside of the frame 130.

In the light guide plate 128, a portion corresponding to an area in which the side portion 130a does not exist may be protruded by a predetermined gap GP toward the light assembly. That is, in the light guide plate 128, a portion that does not contact the side portion 130a may be protruded. A protruded portion of the light guide plate 128 may be adjacent to the housing, compared with other portions. Accordingly, light emitted from the light assembly of the housing may be more easily diffused.

As shown in FIG. 16, the dam pad 129 located on the substrate 122 may be located separately by a predetermined gap DPD from both ends of the substrate 122. A distance DPD in which the dam pad 129 is separated from both ends of the substrate 122 may be similar to a distance AP in which the side portion 130a is extended from the housing area 130HA. Accordingly, the dam pad 129 may be located at a portion in which the side portion 130a is not located.

Because the dam pad 129 is located at a portion in which the side portion 130a does not exist, when the housing 107 is coupled to the frame 130, the dam pad 129 may contact the light guide plate 128. Accordingly, light emitted from the light assembly may advance toward the light guide plate 128 without leaking to other locations. Accordingly, a user can view a display screen that emits more uniform light.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
   a light guide plate comprising a front surface, a rear surface opposite the front surface, and a side surface connecting the front surface and the rear surface;
   a frame comprising a plate covering the rear surface of the light guide plate, a first side portion extending forward from a side of the plate and covering the side surface of the light guide plate, and a second side portion extending forward from the side of the plate, spaced apart from the first side portion and covering the side surface of the light guide plate;
   a housing extending along the side of the plate, the housing comprising a first part coupled to a rear surface of the plate and a second part extending forward from the first part and facing the first and second side portions of the frame;
   a substrate extending along the second part and positioned between the second part and the first and second side portions of the frame; and a light assembly coupled to the substrate and positioned between the first side portion and the second side portion.

2. The backlight unit of claim 1, further comprising a reflection sheet positioned between the light guide plate and the plate.

3. The backlight unit of claim 2, wherein the second portion and the frame are coupled by at least one screw.

4. The backlight unit of claim 2, wherein the second portion and the frame are coupled by a latch.

5. The backlight unit of claim 2, wherein the housing comprises a plurality of heat radiation fins at the second portion.

6. The backlight unit of claim 2, further comprising an oxide layer located at the second portion.

7. The backlight unit of claim 1, wherein the light guide plate comprises a portion corresponding to a gap formed between the first side portion and the second side portion, and wherein the portion protrudes toward the light assembly.

8. A display device comprising:
a display panel;
a light guide plate positioned behind the display panel and comprising a front surface, a rear surface opposite the front surface, and a side surface connecting the front surface and the rear surface;
a frame comprising a plate covering the rear surface of the light guide plate, a first side portion extending forward from a side of the plate and covering the side surface of the light guide plate, and a second side portion extending forward from the side of the plate, spaced apart from the first side portion and covering the side surface of the light guide plate;
a housing extending along the side of the plate, the housing comprising a first part coupled to a rear surface of the plate and a second part extending forward from the first part and facing the first and second side portions of the frame;
a substrate extending along the second part and positioned between the second part and the first and second side portions of the frame; and
a light assembly coupled to the substrate and positioned between the first side portion and the second side portion.

9. The display device of claim 8, further comprising a reflection sheet positioned between the light guide plate and the plate.

10. The display device of claim 8, further comprising a dam pad disposed at the second part and positioned between the first side portion and the second side portion.

11. The display device of claim 10, wherein the dam pad is in contact with the light guide plate.

12. The display device of claim 10, wherein the dam pad is disposed at the substrate.

* * * * *